(12) United States Patent
Maxwell

(10) Patent No.: US 6,778,718 B2
(45) Date of Patent: Aug. 17, 2004

(54) ALIGNMENT OF ACTIVE OPTICAL COMPONENTS WITH WAVEGUIDES

(75) Inventor: Graeme D. Maxwell, Ipswich (GB)

(73) Assignee: Corning Incorporated, Corning, NY (US)

(*) Notice: Subject to any disclaimer, the term of this patent is extended or adjusted under 35 U.S.C. 154(b) by 417 days.

(21) Appl. No.: 10/007,826

(22) Filed: Nov. 9, 2001

(65) Prior Publication Data

US 2003/0091262 A1 May 15, 2003

(51) Int. Cl.⁷ .................................................. G02B 6/12
(52) U.S. Cl. ......................................... 385/14; 385/52
(58) Field of Search .............................. 385/14, 52, 25, 385/39, 12

(56) References Cited

U.S. PATENT DOCUMENTS

| | | | |
|---|---|---|---|
| 4,725,114 A | | 2/1988 | Murphy |
| 5,299,276 A | | 3/1994 | Okamura et al. |
| 5,764,820 A | * | 6/1998 | De Dobbelaere et al. ...... 385/14 |
| 6,118,917 A | * | 9/2000 | Lee et al. ...................... 385/49 |
| 6,164,836 A | | 12/2000 | Yamada et al. |
| 6,343,171 B1 | * | 1/2002 | Yoshimura et al. ............ 385/50 |
| 6,456,766 B1 | * | 9/2002 | Shaw et al. .................... 385/47 |
| 6,477,286 B1 | * | 11/2002 | Ouchi .......................... 385/14 |
| 6,633,707 B1 | * | 10/2003 | Murali ......................... 385/52 |
| 6,650,817 B2 | * | 11/2003 | Murali ........................ 385/131 |

FOREIGN PATENT DOCUMENTS

| | | |
|---|---|---|
| EP | 0 682 276 | 11/1995 |
| EP | 0 864 893 | 9/1998 |
| GB | 2 286 693 | 8/1995 |
| GB | 2 332 956 | 7/1999 |

OTHER PUBLICATIONS

Hunziker et al, "Self–aligned flip–chip packaging of tilted semiconductor optical amplifier arrays on Si motherboard" Electronics Letters, 16th Mar. 1995, vol. 31, No. 6.
Murphy "Fiber Attachment for Guided Wave Devices" Journal of Lightwave Technology, vol. 6, No. 6, Jun. 1988.

* cited by examiner

Primary Examiner—Frank G. Font
Assistant Examiner—Kevin C Kianni
(74) Attorney, Agent, or Firm—Ronald J. Paglierani

(57) ABSTRACT

A connector assembly for connecting and aligning an active optical component with an optical waveguide is provided. The assembly comprises:
(i) a waveguide chip having an optical waveguide embedded beneath a cladding layer and a cavity for accommodating the active optical component comprising at least one wall extending from the surface of the cladding layer through the waveguide; and
(ii) a second chip for carrying the active optical component. The waveguide chip comprises a locating stop and the second chip has first and second reference regions formed thereon, the first reference region being adapted to locate the active optical component, and the second reference region being adapted to engage the surface of the cladding layer and the locating stop of the waveguide chip when the waveguide chip and second chip are connected together with the active optical component located within the cavity in order to provide alignment of the waveguide with the active optical component.

8 Claims, 7 Drawing Sheets

ABSTRACT

ALIGNMENT OF ACTIVE OPTICAL COMPONENTS WITH WAVEGUIDES

BACKGROUND OF THE INVENTION

1. Field of the Invention

This invention relates to the alignment of active optical components with optical waveguides. In particular, though not exclusively, the invention relates to the alignment of an active optical component with respect to a planar optical waveguide chip.

2. Description of the Related Art

In the field of optical communications there is increasingly a trend towards so-called integrated planar-waveguide devices, in which one or more active optical components are mounted on a waveguide chip. Each optical component needs to be aligned with respective optical waveguides. An example of such an integrated planar-waveguide device is a hybrid integrated optical gate matrix switch, which uses an array of semiconductor laser amplifiers optically aligned with an array of waveguides to open or close respective optical circuits.

Planar waveguide devices typically include a substrate, such as silicon, quartz or lithium niobate, one or more waveguide regions (equivalent to the core of an optical fibre), and, surrounding the waveguide regions, one or more cladding regions or layers. In addition, one or more buffer layers may lie between the substrate and the waveguide regions. To achieve waveguiding, it is useful for the waveguide regions to be made of a material or materials having a higher refractive index or indices than the refractive index (or indices) of the cladding region(s). While plastic materials can be used, currently silica and doped silica are preferred.

The waveguides are typically of square or rectangular cross section with typical side lengths of 5 to 8 micrometres. Typically the cladding and buffer layers each have a thickness approximately three times that of the waveguides.

In many planar waveguide devices, there are multiple waveguides and these need to be aligned with and coupled to multiple optical components. The importance of accurate alignment of optical waveguides with other optical components is well known. In aligning an optical waveguide with an active optical component, not only must the waveguide and active layer of the component be aligned angularly and in three co-ordinates for optimum coupling, but this alignment must also be fixed securely and must not be altered during fixation or subsequent processing.

A number of prior art techniques for mounting and aligning optical components with planar waveguide chips are disclosed in U.S. Pat. No. 6,164,836. In order to provide accurate alignment of waveguides with optical components, positioning reference surfaces are required on both the waveguide chip and the optical component suitable for establishing references along three axes. In all of the examples presented in U.S. Pat. No. 6,164,836, a surface of the substrate of the waveguide chip is employed as a 'height' reference surface on which the optical component is mounted to align the level of the component with that of the waveguide regions in a direction perpendicular to the plane of the substrate. Where active optical components are to be used, the requirement for electrical contacts on the waveguide chip means that the height reference surface of the substrate is provided by a terrace formed by a protrusion of the substrate through an electrical contact layer. At positions where a height reference is required, mesas must be formed on the substrate prior to deposition of the silica cladding and waveguiding layers. Hence, the design of the chip must be set at an early stage of manufacture. After subsequent deposition of the cladding and waveguiding layers, careful selective removal is required to expose the mesas to provide the height references for the active components.

Each processing step involved in the manufacture of planar waveguide devices increases costs and the risk of defects, and clearly the later in the manufacturing process that defects become apparent, the greater the cost of wastage. It is therefore desirable to minimise the number of processing steps.

It is an object to produce an improved connector system for passive alignment of active optical components with optical waveguides.

BRIEF SUMMARY OF THE INVENTION

According to a first aspect of the present invention, there is provided a connector assembly for connecting and aligning an active optical component with an optical waveguide, the assembly comprising:

(i) a waveguide chip having an optical waveguide embedded beneath a cladding layer and a cavity for accommodating the active optical component delineated by at least one wall extending from the surface of the cladding layer through the waveguide; and (ii) a second chip for carrying the active optical component, wherein the waveguide chip comprises a locating stop and the second chip has first and second reference regions formed thereon, the first reference region being adapted to locate the active optical component, and the second reference region being adapted to engage the surface of the cladding layer and the locating stop of the waveguide chip when the waveguide chip and second chip are connected together with the active optical component located within the cavity in order to provide alignment of the waveguide with the active optical component.

The inventor has found that the surface of the cladding layer can be used to provide an accurate 'height' reference with respect to the waveguide region which can be used by the second chip to assure alignment with the active layer of the optical component. Since there is no need for the substrate of the waveguide device to provide a height reference, there is no need to form a mesa for this purpose. In this way, the number of process steps required to manufacture the device is significantly reduced, together with associated costs of manufacture. Yield wastage due to defects is reduced due to the reduced number of process steps. In particular, since the number of process steps prior to connection of the active components is reduced, the cost of wastage due to problems at the connection step is significantly reduced.

Furthermore, since it is not necessary to form mesas on the waveguide device, the ultimate location of active components on the waveguide device does not need to be decided until patterning of the core layer of the waveguide device. Hence, it may be possible to use the same waveguide device substrate as a building block for different components.

Suitably, the cladding layer of the waveguide chip and the second reference region of the second chip comprise planar surfaces. The first reference region of the second chip may comprise a locating stop formed on the planar surface.

Suitably, an active optical component is mounted and glued in place on the second chip. Alternatively, the component may be soldered in place. The waveguide chip and the second chip may be glued together.

According to a second aspect, the invention provides a method of connecting and aligning an active optical component with an optical waveguide embedded within a waveguide chip beneath a cladding layer, the method comprising the steps of:

(i) Forming a cavity in the waveguide chip extending from the surface of the cladding layer through the optical waveguide for accommodating the active optical component;

(ii) providing a locating stop on the waveguide chip;

(iii) forming first and second reference regions on a second chip, the first reference region being adapted to locate the active component, and the second reference region being adapted to engage the surface of the cladding layer and the locating stop;

(iv) mounting the active optical component on the second chip;

(v) connecting the second chip to the waveguide chip such that the second reference region engages the surface of the cladding layer and the locating stop such that the active optical component is located in the cavity and in alignment with the waveguide.

Preferably, the cavity is formed in the waveguide chip by deep etching or precision milling. After precision milling the cavity, no further process steps are required prior to connection of the active optical component.

BRIEF DESCRIPTION OF THE SEVERAL VIEWS OF THE DRAWINGS

In order that the invention may be more fully understood embodiments thereof will now be described by way of example only, reference being made to the accompanying drawings in which.

DETAILED DESCRIPTION OF THE INVENTION

Figure 1:
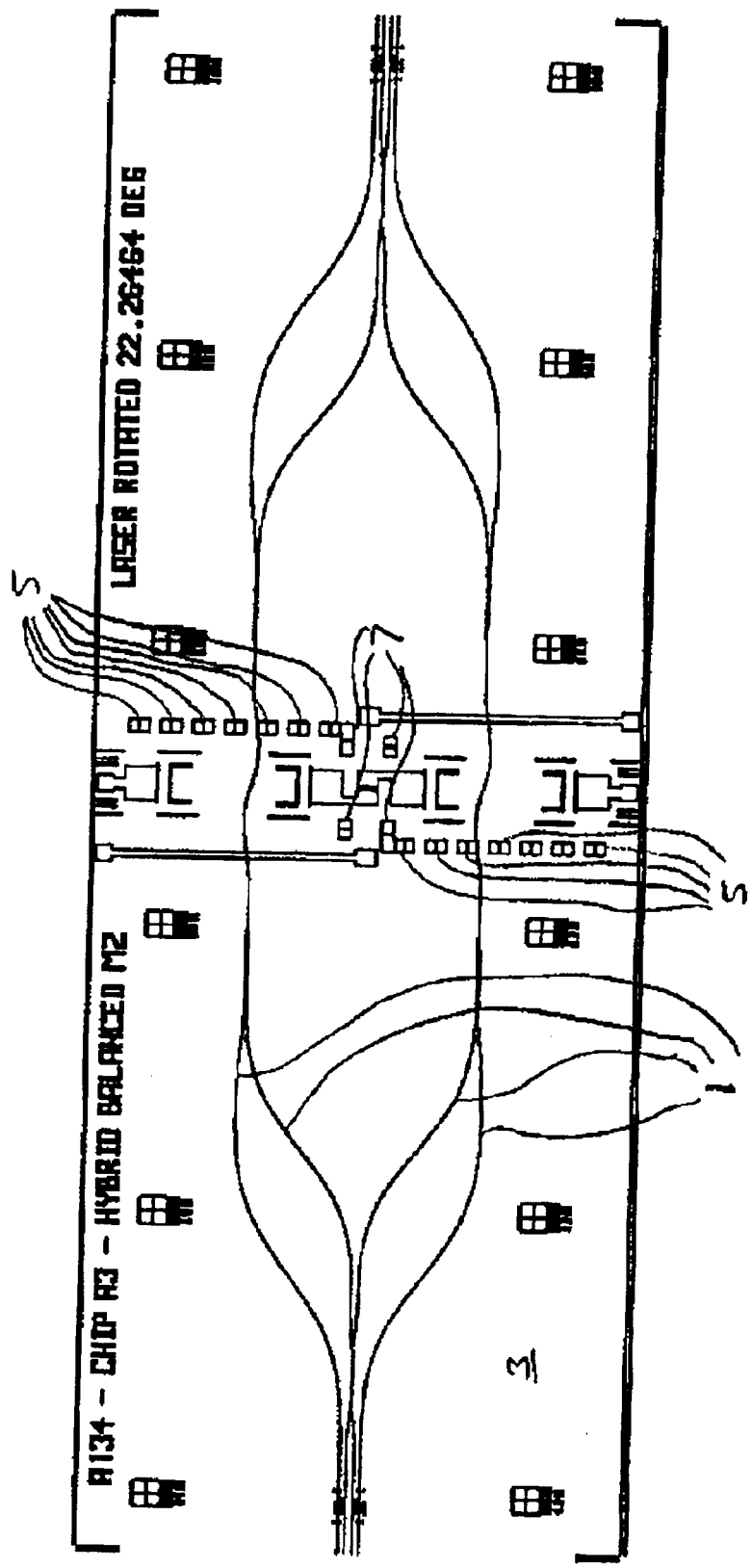
FIG. 1 is a plan view of a waveguide chip.

FIG. 1 shows a planar waveguide chip which forms one of the component parts for a hybrid integrated balanced Mach Zehnder device. The waveguide chip comprises silica waveguides 1 disposed on a silicon substrate in a conventional manner (known as "silica on silicon" technology). The waveguides are embedded beneath a cladding layer 3 having a planar surface, and extend between four input and four output waveguides through two substantially parallel arms by means of a series of branches across the chip. The waveguides are formed by waveguiding regions (also known as "core" regions) comprising glass material having a higher refractive index than the glass material of the cladding layer. By virtue of the difference in refractive index between the cladding and core regions, light is confined to the core due to total internal reflection, as in conventional optical waveguides. Two rows of abutments 5 are situated on the planar surface of the cladding layer 3, each extending across the path of a respective arm of the Mach Zehnder waveguide structure as viewed in plan. A further two rows of abutments 7 extend at right angles to the first rows of abutments 5. The abutments 5, 7 are made from the polymer SU-8 using a photolithographic technique, though other appropriate polymers which are photosensitive to ultraviolet may also be used.

SU-8 is a negative-tone photoresist comprising EPON SU-8 resin and is photosensitised with triaryl sulfonium salt, for example Cyracure UVI from Union Carbide. The photoresist has two important properties suited for micromachining the abutments 5, 7. First, its low molecular weight allows dissolution in a variety of organic solvents. Second, the spun layer has a very low optical absorption in the near ultraviolet spectrum. SU-8 is spun onto the chip using conventional techniques. The viscosity of the SU-8 polymer is chosen so that when it is spun at 4000 rpm, a desired thickness of polymer coverage over the planar silica chip is achieved. For example, if SU-8-10 is spun at 400 rpm, the resulting polymer thickness will be 10 micrometres. Similarly, if SU-8-500 is spun onto the planar silica at 4000 rpm, the polymer covering will have a thickness of 500 micrometres. Thus, the thickness can vary from approximately 10 to 500 micrometres. According to the embodiment shown in FIG. 1 the viscosity of the SU-8 is selected so that when it is spun on to the planar silica chip, the thickness of the covering achieved is preferably approximately 60 $\mu$m. Prior to spinning the planar silica chip is pre baked at 200° C. for approximately 15 minutes. The SU-8-60 is then applied on to the planar silica. The planar silica is mounted for spinning and is then spun at 2250 rpm for 15 seconds. The resist coated planar silica chip is subsequently soft baked at 70° C. before being further baked at 90° C. A standard chromium mask, which blocks ultraviolet radiation, is prepared. The mask which is designed using CAD and by standard photolithography techniques includes windows corresponding to the desired shapes and positions of the abutments to be patterned onto the photoresist, and whose dimensions can be determined extremely accurately. The mask is placed onto the coated component.

The resist is then subject to near ultraviolet exposure of around 400 nm through the mask. The exposure device may be a mask aligner in contact mode (for example, Karl Suss model nos. MA4 and MJB3). Those areas of the photoresist polymer disposed beneath the windows are exposed to the UV radiation and become hardened. The exposure dose is between 300 and 1200 mJ/cm2, depending on the thickness of the photoresist layer and is of the duration of approximately 90 seconds. The exposed resist is subjected to post exposure baking on a hot plate for approximately 3 minutes at 50° C., followed by 90° C. The exposed, post baked resist coated component is then developed in an organic solvent, such as propylene glycol methyl ether acetate (PGMEA). The development removes those areas of the photoresist that have not become hardened by the UV exposure.

After development in organic solvent, the areas patterned in the shape of the abutments 5, 7, which have been hardened by exposure to the ultraviolet radiation remain on the planar chip. Those areas disposed behind the mask, and which have not been hardened, as they were not exposed to UV radiation are dissolved and washed away by the solvent. The abutments 5, 7 thus comprise hardened SU-8 polymer and have a height of 60 $\mu$m equal to the thickness of the spun layer and a high aspect ratio of approximately 20, that is an abutment having a height of 60 microns will have an error of up to 3 microns. The positioning of the abutments 5, 7 on the planar silica chip can be accurately determined using CAD. These positions are critical as will become clear.

Figure 2:
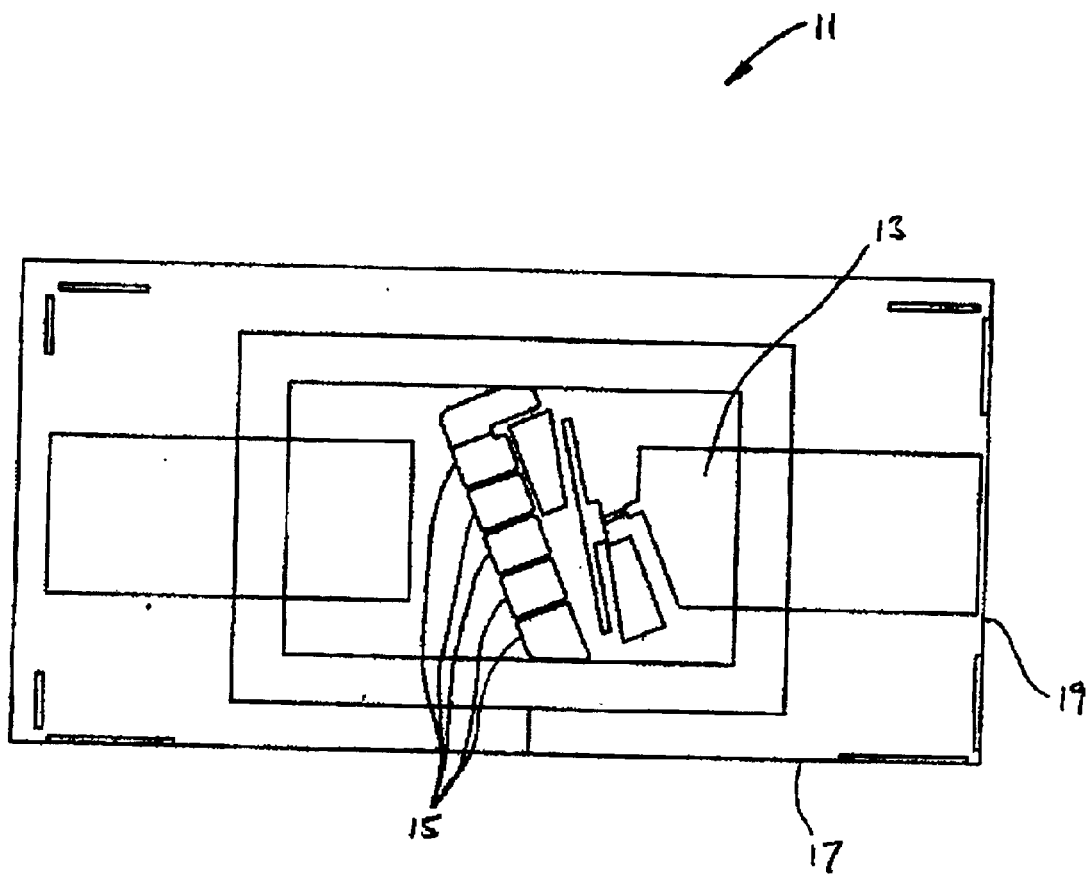
FIG. 2 is a plan view of a connector chip for mounting an active optical component.

FIG. 2 shows a connector chip or daughter board 11 for mounting an active optical component. The daughter board comprises a silicon substrate on which a suitable electrode pattern 13 has been formed to provide electrical power to an active optical component when mounted thereon. Rows of SU-8 abutments 15 and silicon dioxide columns 16 (see FIG. 7) are accurately formed on the daughter board 11 to provide first reference regions for locating the active optical component as described below. Two edges of the daughter board 17, 19 are precision sawn using a NanoAce™ precision dicer/scriber (marketed by Loadpoint Limited in UK) to an accuracy of about 0.2 $\mu$m.

Figure 3:
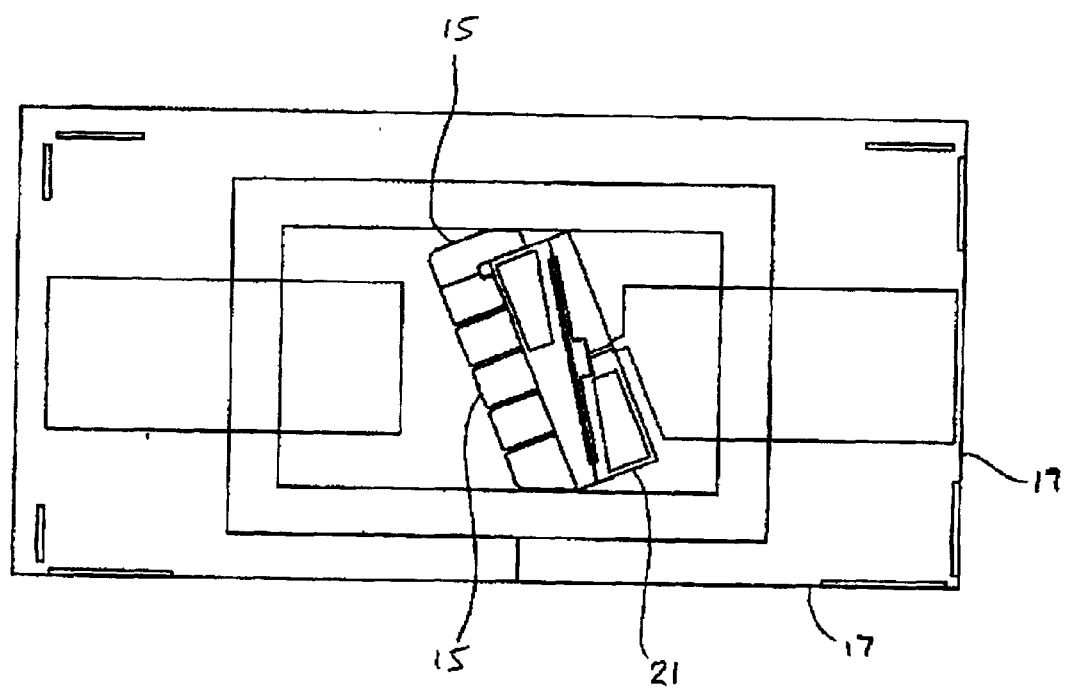
FIG. 3 is a plan view of the connector chip of FIG. 2 with a mounted active optical component.
Figure 7:
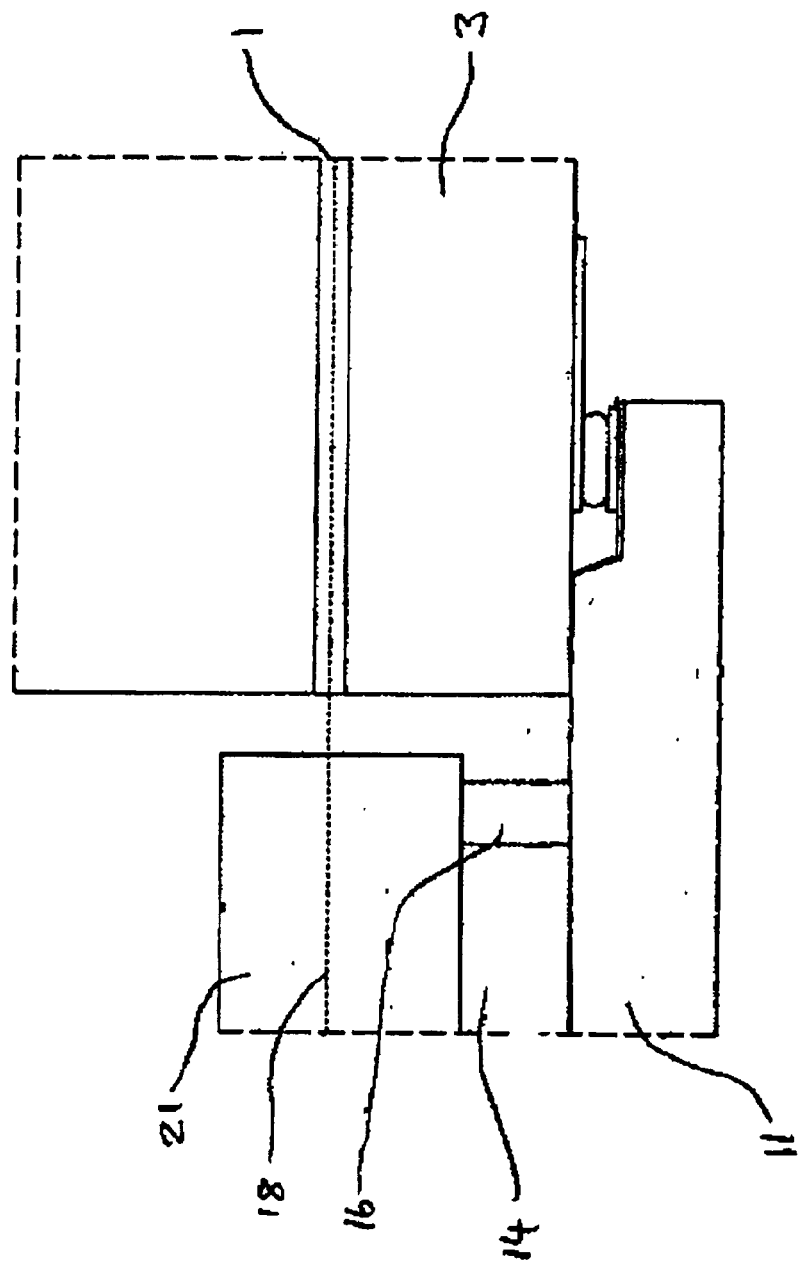
FIG. 7 is a section through part of the waveguide chip and connector chip of FIG. 5.

As shown in FIGS. 3 and 7, a precision cleaved semiconductor optical amplifier 21 is passively mounted with the base of its substrate on the columns 16 and its precision cleaved edges aligned against the abutments 15 on the daughter board, the abutments 15 so forming a locating edge. Solder 14 is then melted between the columns 16 to form the electrical connection with the contacts on the daughter board and to fasten the optical amplifier into place. Use of the base of the amplifier substrate on the columns 16 and the precision cleaved edges of the optical amplifier against the abutments 15 enables the active region of the amplifier to be positioned in 3-dimensions with respect to the daughter board to an accuracy of about 1.0 $\mu$m to create a laser amplifier module.

Figure 4:
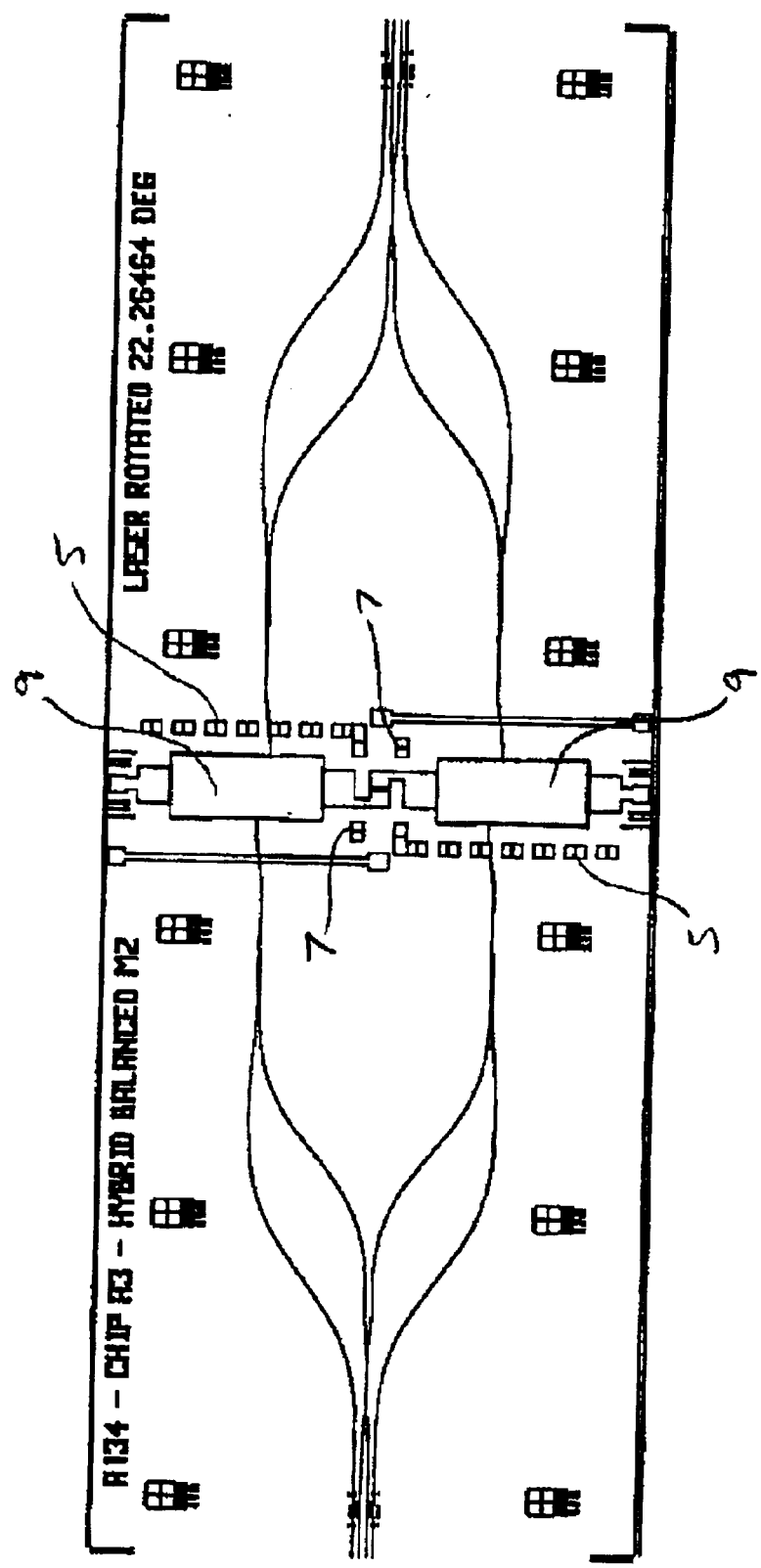
FIG. 4 is a plan view of the waveguide chip shown in FIG. 1 with location cavites milled through two waveguides.

To mount the laser amplifier module shown in FIG. 3 onto the waveguide device of FIG. 1, a hole or cavity must first be milled from the surface of the cladding layer through a waveguide in the waveguide chip to provide clearance for the optical amplifier. FIG. 4 shows the waveguide chip of FIG. 1 with a hole 9 milled through each arm of the waveguide structure ready to accommodate two laser amplifier modules. The holes 9 are produced by machining or photolithography etching, which forms walls delineating the holes with a precision finish sufficiently accurate to define the waveguide ends and render them suitable for efficient optical coupling. The holes are milled to an accuracy of around 0.5 $\mu$m with respect to the abutments 5, 7 to provide 5–10 $\mu$m clearance between the milled waveguide ends and the precision cleaved optical amplifier end facets as will become clear below. Conveniently, the cavities are milled right through the waveguide chip, though they need only be deep enough to accommodate the optical amplifiers 21, which are typically 110 $\mu$m thick.

Figure 5:
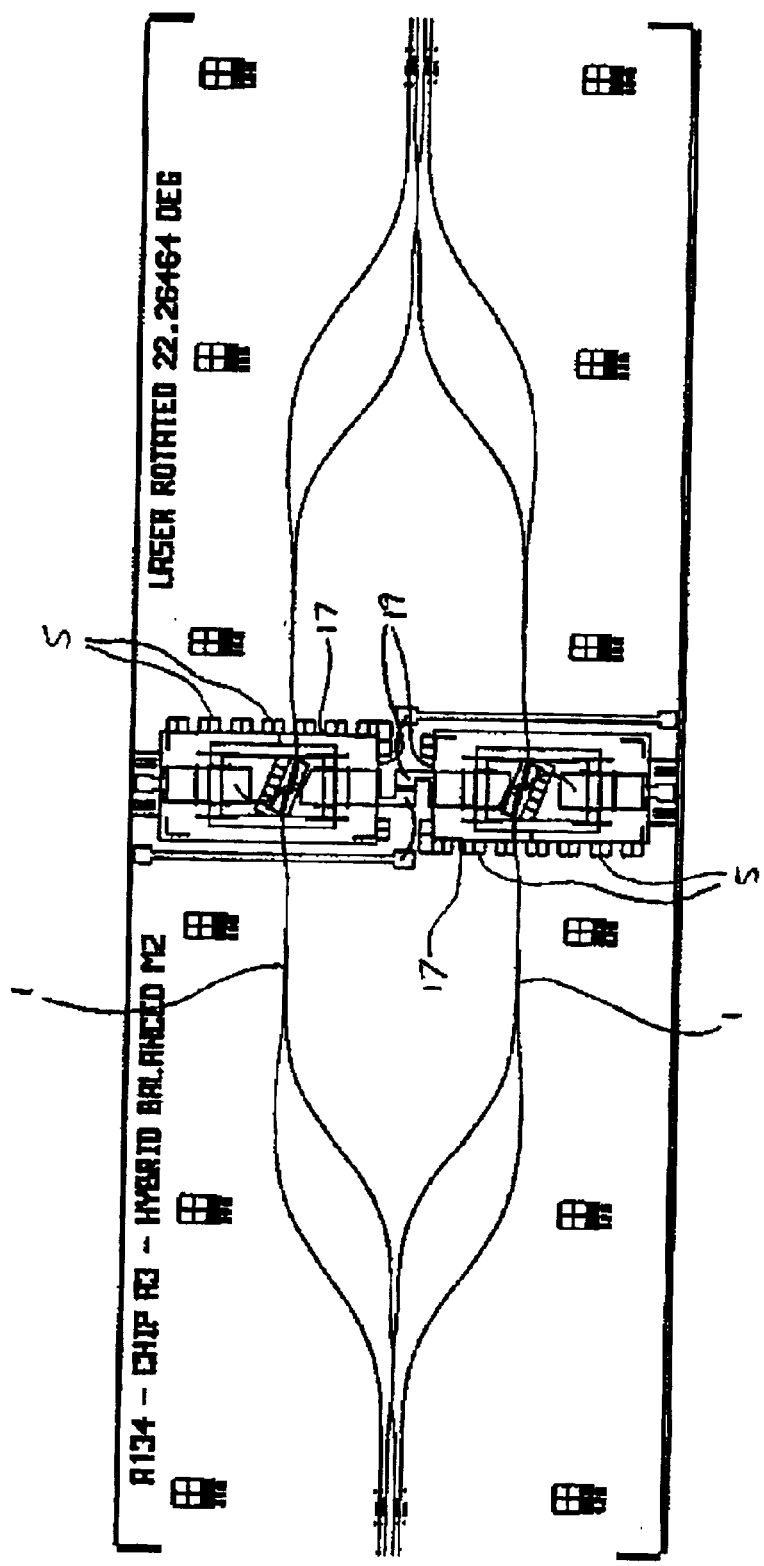
FIG. 5 is a plan view of the waveguide chip shown in FIG. 4 with two connector chips as shown in FIG. 3 mounted therein.
Figure 6:
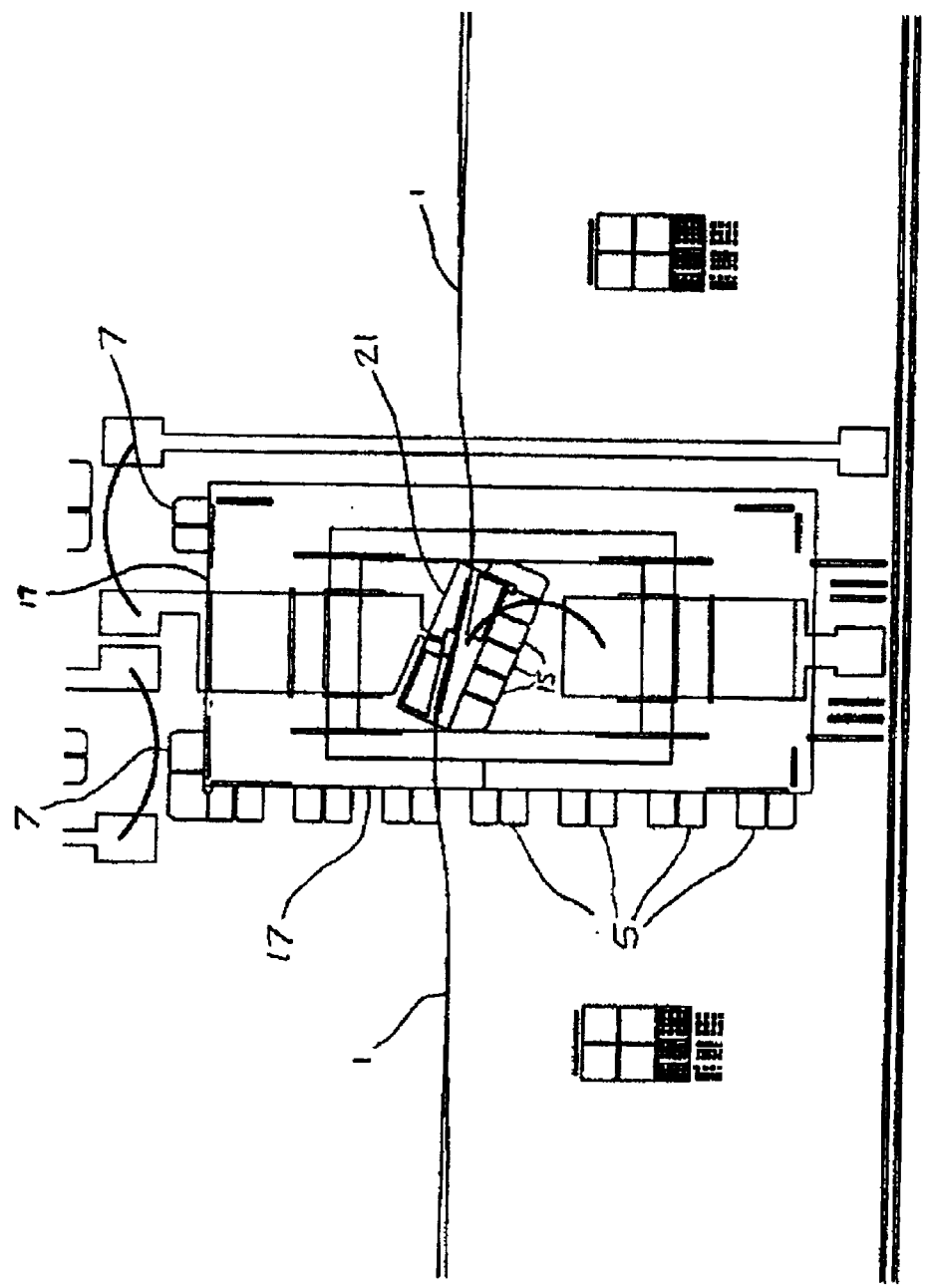
FIG. 6 shows an enlarged section of FIG. 5.

Once a cavity has been milled, a laser amplifier module is located on the waveguide device with the surface of the silicon substrate of the daughter board 11 engaging the cladding layer 3 of the waveguide device, the optical amplifier protruding into the cavity, and the precision sawn edges of the daughter board abutting against the abutments 5, 7, which act as locating stops (see FIGS. 5 to 7). The orientation and spacing of the amplifier module with respect to the waveguide device is set by interaction of the optical amplifier and daughter board with the abutments 15 and 5, 7 respectively. The level or 'height' of the active layer of the optical amplifier is matched to that of the waveguide by selecting the height of the columns 16 so that the distance from the surface of the silicon substrate of the daughter board 11 to the active region 18 of the optical amplifier 21 is matched to that from the surface of the cladding layer 3 of the waveguide device to the waveguide region 1. In this way, the surface of the silicon substrate together with the precision sawn edges 17, 19 of the daughter board act as a second reference region for locating the daughter board with respect to the waveguide chip. Thus, the laser amplifier module is passively aligned to the waveguide device. The gaps between the amplifier end facets and the waveguide ends may then be filled with index matching gel to optimise optical coupling, polishing of the waveguide ends not being necessary.

Each arm of the Mach Zehnder waveguide structure may be fitted with a semiconductor optical amplifier in the manner described to produce a hybrid integrated balanced Mach Zehnder device as shown in FIG. 5. However, the invention described herein with reference to FIGS. 1 to 7 is by way of example only. It will be clear that the invention extends to further modifications not described. The invention may be used for connecting and aligning other types of active optical component easily and conveniently with alternative waveguide structures as required. In all cases, the connector assembly and method enables passive alignment of active optical components with waveguides as shown.

It will be apparent to those skilled in the art that various modifications and variations can be made to the present invention without departing from the scope of the invention. Thus, it is intended that the present invention cover such modifications and variations provided that they come within the scope of the appended claims or their equivalents.

What is claimed is:

1. Connector assembly for connecting and aligning an active optical component with an optical waveguide, the assembly comprising:
   (i) a waveguide chip having an optical waveguide embedded beneath a cladding layer and a cavity delineated by at least one wall extending from the surface of the cladding layer through the waveguide; and
   (ii) a second chip for carrying the active optical component and for insertion into said cavity wherein the waveguide chip comprises a locating stop and the second chip has first and second reference regions formed thereon, the first reference region to locate the active optical component, and the second reference region to engage the surface of the cladding layer and the locating stop of the waveguide chip in order to provide alignment of the waveguide with the active optical component.

2. Connector assembly according to claim 1, wherein the locating stop is formed on the cladding layer of the waveguide chip.

3. Connector assembly according to claim 1 or 2, wherein the cladding layer of the waveguide chip and the second reference region of the second chip comprise planar surfaces.

4. Connector assembly according to claim 3, wherein the first reference region of the second chip comprises a locating edge formed on the planar surface.

5. Connector assembly according to any preceding claim, further comprising an active optical component mounted and glued or soldered in place on the second chip.

6. Connector assembly according to claim 5, wherein the waveguide chip and the second chip are glued or soldered together.

7. Method of connecting and aligning an active optical component with an optical waveguide embedded within a waveguide chip beneath a cladding layer, the method comprising the steps of:
   (i) Forming a cavity in the waveguide chip extending from the surface of the cladding layer through the optical waveguide for accommodating the active optical component;

(ii) providing a locating stop on the waveguide chip;

(iii) forming first and second reference regions on a second chip, the first reference region to locate the active component, and the second reference region to engage the surface of the cladding layer and the locating stop;

(iv) mounting the active optical component on the second chip;

(v) connecting the second chip to the waveguide chip such that the second reference region engages the surface of the cladding layer and the locating stop such that the active optical component is located in the cavity and in alignment with the waveguide.

8. Method according to claim 7, wherein the cavity is formed in the waveguide chip by precision milling or deep etching.

* * * * *